United States Patent Office 3,785,998
Patented Jan. 15, 1974

3,785,998
METHOD OF CATALYST MANUFACTURE BY IMPREGNATING HONEYCOMB-TYPE SUPPORT
James Hoekstra, Evergreen Park, Ill., assignor to Universal Oil Products Company, Des Plaines, Ill.
No Drawing. Filed June 30, 1971, Ser. No. 158,588
Int. Cl. B01j 11/46
U.S. Cl. 252—477 R      6 Claims

ABSTRACT OF THE DISCLOSURE

A relatively low surface area honeycomb-type ceramic support is impregnated with a platinum group metal component dissolved in an alumina sol, the sol further containing a soluble plasticizer. The support is thereafter calcined to form a platinum group metal component dispersed on a uniformly thin, high surface area alumina film deposited on said support.

---

This invention relates to a novel method of catalyst manufacture. More particularly, this invention relates to a method of preparing a platinum group metal component dispersed on a high surface area alumina deposited as a uniform thin film on a relatively low surface area ceramic support. The present invention is particularly adapted to the manufacture of a rigid, unitary, catalytic element useful to catalyze the oxidation of carbon monoxide and unburned hydrocarbons contained in exhaust gases of an internal combustion engine.

Certain refractory materials, for example the various high surface area refractory inorganic oxides such as alumina, silica, zirconia, alumina-silica, alumina-zirconia, etc., are efficient supports for any number of catalytically active materials when utilized in a particulate form. Such refractory supports are readily manufactured and commonly employed in the form of powders, pills, pellets, extrudates, or other particulate form including micro and macro spheroids resulting from spray-drying or dropping techniques. However, the described refractory materials, which embody the high surface area characteristics so essential to efficient catalyst support materials, exhibit a physical instability under conditions of thermal stress which makes them generally unsuitable for use as a larger unitary support structure for catalytic components in the conversion, for example, of automobile exhaust gases.

On the other hand, the desired physical stability is realized by utilizing certain ceramic materials such as sillimanite, petalite, cordierite, mullite, zircon, zircon-mullite, spodumene, magnesium silicates, aluminum silicates, etc., as a unitary catalyst support. However, although such ceramic materials are characterized by a low coefficient of thermal expansion—a particularly desirable feature in the larger unitary catalyst structures herein contemplated, they are invariably also characterized by a relatively low surface area which makes them generally unsuitable as an efficient catalyst support material. It has therefore been the practice to deposit a high surface area film or coating on the surface of the ceramic, e.g., a thin, high surface area refractory inorganic oxide film or coating.

It is an object of this invention to present a novel method of applying a platinum group metal component dispersed on a high surface area alumina deposited as a uniform, thin film on a rigid, low surface area, unitary support. The method of this invention is particularly directed to the manufacture of catalysts characterized by a rigid, unitary or homogenous skeletal structure, frequently referred to as a monolithic structure, comprising thin laminated or superimposed sheets of a corrugated ceramic material providing a plurality of adjacent, parallel and unidirectional channels therethrough, and commonly referred to as a honeycomb. While the method of this invention can also be used to apply high surface area coatings on particulate, finely divided catalyst supports, the real advantage is in the application of high surface area coatings to the larger, unitary support structures in the manufacture of catalytic elements for inclusion in an exhaust gas converter system.

In one of its broad aspects, the present invention embodies a method of preparing a catalytic composite of a platinum group metal component dispersed on a high surface area alumina deposited as a uniformly thin film on a relatively low surface area ceramic support, and comprises impregnating said low surface area ceramic support with a platinum group metal compound dissolved in alumina sol, said sol further containing at least about 5 wt. percent of a soluble organic plasticizer; and calcining the impregnated refractory support at a temperature of from about 315° to about 650° C.

One of the more specific embodiments is in the method of preparing a catalytic composite of platinum dispersed on a high surface area alumina deposited as a uniformly thin film on a cordierite honeycomb support which comprises impregnating said support with chloroplatinic acid dissolved in an aluminum chloride sol, said sol being prepared by effecting a reduction in the chloride anion concentration of an aqueous aluminum chloride solution to provide an aluminum/chloride ratio of from about 1:1 to about 2:1, said sol containing from about 10 to about 20 wt. percent polyethylene glycol characterized by an average molecular weight of from about 200 to about 3000, and from about 0.05 to about 0.5 wt. percent polyoxyethylene alcohol characterized by an average molecular weight of from about 200 to about 500; and calcining the impregnated honeycomb support in an oxidizing atmosphere at a temperature of from about 475° to about 650° C. Other objects and embodiments of this invention will become apparent in the following more detailed specification.

The alumina sols herein contemplated are used as are formed by reducing the acid anion concentration of an aqueous solution of an acid salt of aluminum whereby olation occurs with the formation of inorganic polymers of colloidal dimension suspended in the remaining liquid. Such sols are in contrast to a colloidal suspension of discrete, minute particles of a preformed alumina. Suitable acid salts of alumina include aluminum chloride, aluminum sulfate, aluminum nitrate, aluminum acetate, and the like.

Reduction in the acid anion concentration of said solution can be accomplished in any conventional or otherwise convenient manner. For example, an aqueous aluminum chloride solution can be subjected to electrolysis utilizing an electrolytic cell with a porous partition between the anode and cathode whereby acid anions are removed from the cathode compartment with the formation of an alumina sol therein. In some cases, as with an aqueous aluminum acetate solution, where the anion is sufficiently volatile, the desired reduction in anion concentration can be effected simply by heating. A particularly suitable method of preparing a sol involves the use of aluminum metal as a neutralizing agent in conjunction with, for example, an aqueous aluminum chloride solution. In this instance, the salt of neutralization is itself a hydrolyzable aluminum salt subject to ultimate sol formation.

One convenient and preferred method, particularly suitable for the preparation of an alumina sol, comprises digesting aluminum pellets or slugs in aqueous hydrochloric acid and reducing the chloride anion concentration of the resulting aluminum chloride solution through use of an excess of aluminum reactant as a neutralizing agent. The described sols are preferably prepared to contain about 14 wt. percent aluminum, preferably from about 12 to about 15 wt. percent, with an aluminum/chloride atom ratio of from about 1:1 to about 2:1. Generally, the sols will contain from about 8 to about 12 wt. percent chloride.

In accordance with the present method of catalyst manufacture, a platinum group metal component is impregnated on said ceramic support dissolved in the aforesaid sol. Thus, a platinum group metal compound, i.e., a compound of platinum, palladium, rhodium, ruthenium, iridium, etc., is dissolved in the sol subsequently deposited on the ceramic surface. Of the platinum group metals, platinum is a preferred catalyst component. Compounds of platinum soluble in the described sol include platinum chloride, chloroplatinic acid, dinitrodiamino platinum, ammonium chloroplatinate, etc., with chloroplatinic acid being particularly suitable. The platinum group metal component is effective in an amount equivalent to from about 0.05 to about 1.0 wt. percent of the unitary catalyst element, from about 0.2 to about 0.5 wt. percent being preferred. This will entail the use of a sol containing up to about 20 wt. percent platinum group metal.

Pursuant to the present invention, the aforesaid sol further contains organic plasticizer dissolved therein. The organic plasticizer is selected to improve the flexibility characteristics of the sol whereby blistering and cracking of the surface coating is minimized during the initial drying and calcining stages of the impregnated support material, and a durable, thin uniform film of alumina is formed thereon. The organic plasticizer is suitably a polyethylene glycol with an average molecular weight of from about 200 to about 3000, and preferably with an average molecular weight of from about 200 to about 700. Plasticizers substantially as described are manufactured and available under the tradename "Carbowax." In any case, the plasticizer is utilized in an amount equivalent to at least about 5 wt. percent of the sol and preferably from about 10 to about 20 wt. percent.

The alumina sol is advantageously utilized containing a nonionic surfactant, suitably at least about 0.05 wt. percent. Suitable nonionic surfactants include the various and well known polyoxyethylene alkylphenols, polyoxyethylene alcohols, polyoxyethylene esters of fatty acids, polyoxyethylene mercaptans, polyoxyethylene alkylamines, polyoxyethylene alkylamides, and the like. A polyoxyethylene alcohol with an average molecular weight of from about 200 to about 500 is particularly suitable. The surfactant is included in the sol to facilitate penetration and even distribution of the sol, for example, in the fissures or clefts common to a honeycomb support structure. Preferably, the nonionic surfactant is utilized in an amount comprising from about 0.05 to about 0.5 wt. percent based on the weight of the alumina sol.

The low surface area ceramic support may be impregnated with the described sol by impregnating the techniques known to the art. Thus, the ceramic support may be soaked, dipped, suspended, or otherwise immersed in the sol, suitably at ambient temperature conditions. The impregnation process may be repeated one or more times to deposit a satisfactory thin uniform coating on the surface of the ceramic support structure. In any case, the impregnated support is subsequently calcined at a temperature of at least about 315° C. to form the desired thin uniform high surface area alumina film deposited on the ceramic support.

The impregnated ceramic support is subsequently calcined at a temperature of from about 315° to about 650° C., and preferably at a temperature of from about 475° to about 650° C. The calcination is suitably effected in air containing from about 20% to about 50% steam. Reduction of the platinum group metal component is accomplished in the early stages of the calcination treatment, the reduction being facilitated by the decomposing plasticizer included in the sol. An inert gas such as nitrogen or flue gas may be used during the first stages of calcination to aid in the reduction of the platinum group metal component, with air or oxygen being subsequently added to oxidize the carbon and other organic residue.

The following example is presented in illustration of the method of this invention and is not intended as an undue limitation on the generally broad scope of the invention as set out in the appended claims.

EXAMPLE I

An alumina sol was prepared by digesting an excess of aluminum in aqueous hydrochloric acid under reflux conditions (98°–115° C.). The sol contained 14.2 wt. percent aluminum in a 1.5:1 ratio with the chloride anion content thereof, and had a specific gravity of 1.4. About 1860 milliliters of the sol thus prepared was admixed with 105 grams of an aqueous chloroplatinic acid solution containing 20.9 grams of platinum, and with 465 milliliters of a polyethylene glycol plasticizer having an average molecular weight of about 600 (Carbowax), and 1.52 grams of a polyoxyethylene alcohol nonionic surfactant having an average molecular weight of about 240 (Antarox BL–240).

A cordierite ceramic honeycomb structure weighing 447.3 grams was then immersed in the described alumina sol with a gentle reciprocating movement in the direction of the parallel channels to insure contact and an even distribution of the sol on the honeycomb surface. After about 4 minutes, the impregnated honeycomb was removed and blown free of excess sol with a stream of air. The impregnated honeycomb, containing about 229.2 grams of alumina sol adhered to the surface thereof, was dried for about 2 hours in a forced-draft oven at 150° C. The dried, impregnated honeycomb was subsequently heated to 540° C. over a one-half hour interval and then calcined at 540° C. for 2 hours in a stream of air containing about 30 wt. percent steam. While the ceramic honeycomb initially exhibited a surface area of less than about 1 m.$^2$/gm., the alumina-coated product had a surface area of about 21 m.$^2$/gm. The cordierite honeycomb structure contained about .037 wt. percent platinum dispersed on the high surface area alumina coating.

I claim as my invention:

1. A method of preparing a catalytic element useful to catalyze the oxidation of carbon monoxide and unburned hydrocarbons contained in exhaust gases of an internal combustion engine, said catalytic element consisting essentially of a platinum group metal component dispersed on alumina deposited as a uniform thin film on a relatively low surface area monolithic honeycomb type ceramic support which comprises:
    (a) forming an aqueous alumina chloride sol consisting essentially of at least about 5 wt. percent of a water soluble polyethylene glycol plasticizer having an average molecular weight of from about 200 to about 3000 and a water soluble platinum group metal compound, said alumina chloride sol being prepared by effecting a reduction in the chloride anion concentration of an aqueous solution of aluminum chloride to provide an aluminum/chloride ratio of from about 1:1 to about 2:1 and said platinum group metal compound being utilized in an amount to yield a final catalyst composite containing from about 0.05 to about 1.0 wt. percent platinum group metal;
    (b) impregnating said ceramic support with the sol prepared in step (a) by immersing the ceramic support in the sol; and,
    (c) calcining the impregnated ceramic support at a temperature of from 315° to 650° C.

2. The method of claim 1 further characterized in that said platinum group metal compound is a platinum compound.

3. The method of claim 1 further characterized in that said platinum group metal compound is chloroplatinic acid.

4. The method of claim 1 further characterized in that said sol contains from about 10 to about 20 wt. percent of said plasticizer.

5. The method of claim 1 further characterized in that said impregnated ceramic support is calcined at a temperature of from about 475° to about 650° C.

6. The method of claim 1 further characterized in that the alumina sol further contains a nonionic surfactant utilized in an amount comprising from about 0.05 to about 0.5 wt. percent based on the weight on the alumina sol.

References Cited

UNITED STATES PATENTS

| | | | |
|---|---|---|---|
| 2,930,765 | 3/1960 | Cooper et al. | 252—466 Pt |
| 2,620,314 | 12/1952 | Hoekstra | 252—448 |
| 3,502,596 | 3/1970 | Sowards | 252—477 R |
| 2,940,924 | 6/1960 | Brennan et al. | 252—466 Pt |
| 3,165,479 | 1/1965 | Burk et al. | 252—466 Pt |
| 3,152,092 | 10/1964 | Cornelius | 252—466 Pt |
| 3,112,184 | 11/1963 | Hollenbach | 161—68 |
| 2,697,066 | 12/1954 | Sieg | 252—463 |
| 3,397,154 | 8/1968 | Talsma | 252—463 |
| 3,563,913 | 2/1971 | Krijger et al. | 252—463 |

FOREIGN PATENTS

| | | | |
|---|---|---|---|
| 931,096 | 7/1963 | Great Britain | 252—477 R |

L. DEWAYNE RUTLEDGE, Primary Examiner
W. R. SATTERFIELD, Assistant Examiner

U.S. Cl. X.R.

252—461, 463, 465, 466 Pt, 472